United States Patent [19]
Poirier

[11] 3,787,843
[45] Jan. 22, 1974

[54] RADAR FENCE SYSTEM
[75] Inventor: Joseph L. Poirier, Chelmsford, Mass.
[73] Assignee: The United States of America as represented by the Secretary of the Air Force, Washington, D.C.
[22] Filed: Dec. 11, 1972
[21] Appl. No.: 314,054

[52] U.S. Cl. .......... 343/5 PD, 340/258 B, 343/7 PF
[51] Int. Cl. ......................... G01s 9/02, G08b 13/22
[58] Field of Search..... 343/5 PD, 7 PF; 340/258 R, 340/258 B

[56] References Cited
UNITED STATES PATENTS
2,958,862 11/1960 Rey ................................ 343/7 PF
3,603,990 9/1971 Poirier ................................ 343/5

Primary Examiner—T. H. Tubbesing
Attorney, Agent, or Firm—Harry A. Herbert, Jr.

[57] ABSTRACT

A radar fence system which distinguishes the location of a target of interest to be inside or outside of a predetermined distance (range fence). A noise signal is transmitted toward the target of interest. A portion of the transmitted signal is phase shifted periodically a predetermined amount and then mixed with a received target return signal to provide a resultant signal. It is required that the transmitted signal and received signal be separated. Only if the target of interest is within the range fence will the resultant signal be modulated.

4 Claims, 1 Drawing Figure

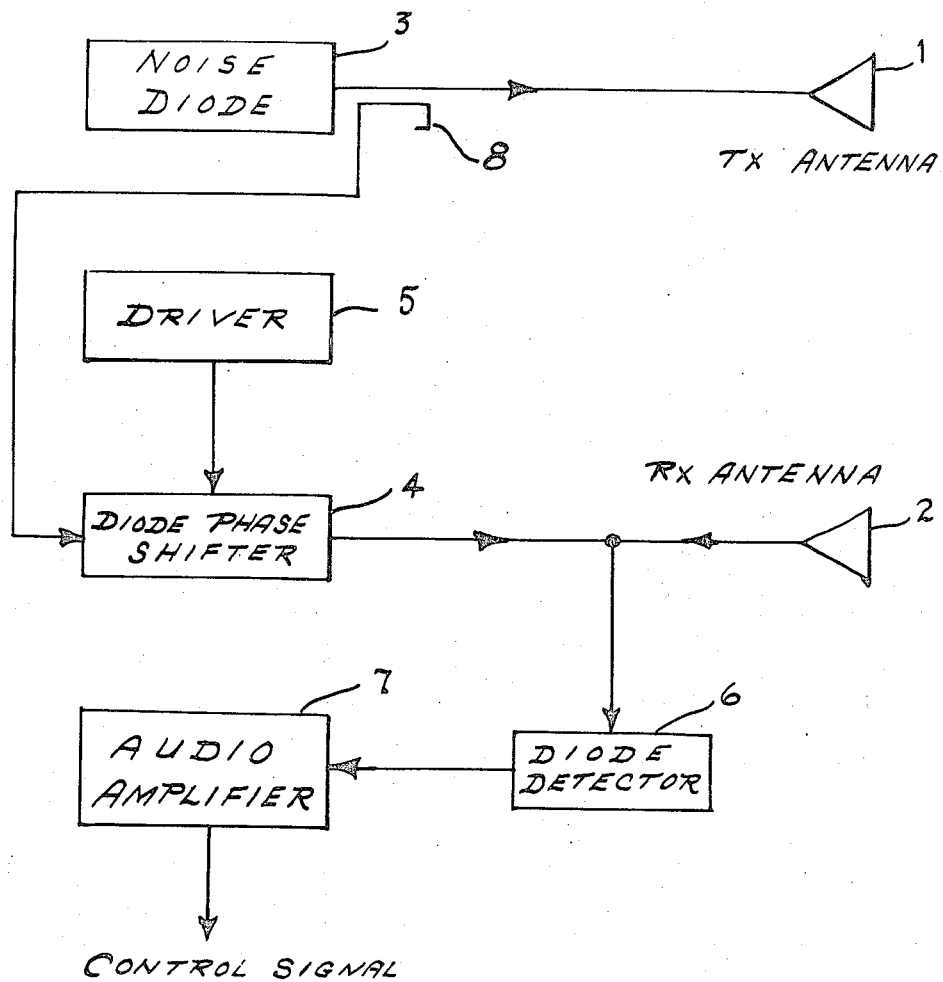

RADAR FENCE SYSTEM

BACKGROUND OF THE INVENTION

Radar basically is a system for locating reflecting objects by means of radio signal. Radar ranging is accomplished by timing the period required for the radio signals to make the round trip from a transmitter to the reflecting object and back. Generally, radar systems are complex and require a multiplicity of associated components. For example, most radar systems require that a reflecting object be measured accurately as to distance, azimuth, and elevation.

The present invention, in sharp contrast to the prior art, eliminates the aforesaid complexity and substitutes therefore a simple method and system using a minimum number of components for determining the presence of a reflecting object (target of interest) within a predetermined range (range fence). It is basically a radar system which distinguishes the location of a target of interest to be inside or outside a predetermined distance. The radar will not respond to the target of interest outside the range fence. The same target anywhere inside the range fence will cause the radar to produce an output control signal.

The present invention provides a very small, lightweight, compact radar fence system particularly useful for short range applications. Still further, it may be utilized in proximity fuses, close approach sensors, and intrusion alarm systems.

SUMMARY OF THE INVENTION

A radar fence system is provided which distinguishes the location of a target of interest to be inside or outside of a predetermined distance (range fence). A noise signal is transmitted toward the target of interest. The target of interest reflects a signal back toward the transmitter site for reception thereof. The transmitted signal and received signal must be and are separated from each other at the aforementioned site. At the site, a portion of the transmitted noise signal is periodically phase shifted. The received signal is added to the phase shifted reference signal and the interaction between two signals observed at a detector output. The detector output signal will be modulated only if the target of interest is within the range fence.

DESCRIPTION OF THE DRAWING

The single FIGURE of the present invention shows a preferred embodiment in block diagram form.

DETAILED DESCRIPTION OF THE PREFERRED EMBODIMENT

The detailed operation of the system is best explained with reference to the single FIGURE. But first it must be recalled that two signals from the same quasimonochromatic source can only be made to interfere if their relative path length to the point of interference is less than the coherence length of the radiation. The coherence length $l_c$ of the radiation is $$l_c = c/\Delta f \quad (1)$$

where $c$ is the propagation velocity and $\Delta f$ the bandwidth of the radiation. The basic principle of operation of the system is to determine whether or not the signal reflected from a target interferes with a reference signal. If it does, the round trip distance to the target is less than the coherence length. If no interference effects are observed, the distance is larger than the coherence length.

The system requires that the transmitted and received signal be separated. This can be accomplished in several ways. A circulator could be used or as indicated in the single FIGURE, two separate antennas 1 and 2 may be used. The signal from noise diode source 3 is transmitted from transmitting antenna 1. A small amount of the signal obtained by way of coupler 8 is passed through phase shifter 4 which is driven at an audio frequency by driver 5. The phase shifter need not be exotic or linear. All that is required is that there is a phase difference of about one-half wavelength between the minimum and maximum values of the phase shifter.

The signal from the target of interest is received by antenna 2 and is added to the phase shifted reference signal at the input of detector 6 and the interaction of the two signals observed at the detector output. The equation governing the detected intensity $I_D$ is $$I_D = I_{REF} + I_{REC} + 2\sqrt{I_{REF}I_{REC}}\,\lambda\cos\theta \quad (2)$$

Here $I_{REF}$ and $I_{REC}$ are the intensities of the reference and received signals respectively, $\theta$ is the instantaneous phase between the two signals, and $\lambda$ is the complex degree of coherence between the two signals. Of significance is that $$\lambda \approx 0 \text{ for Range} > \text{Fence Range}$$
$$\lambda \approx 1 \text{ for Range} < \text{Fence Range} \quad (3)$$

According to equations (2) and (3) the detector signal will be modulated only if the target is within the range fence. The signal frequency will be equal to the phase shifter driver frequency.

The modulation signal is then detected in diode detector 6 and passed through amplifier 7 to generate a control signal. The detection can be made as simple as a transistorized peak detector or as complex as a narrow band coherence detector depending on the need.

It is noted that driver 5 operates in such a manner as to switch phase shifter 4 on and off at some preselected rate thus inserting a periodic phase shift to determine correlation.

It is still further noted that the fence distance is determined by the bandwidth of the noise source. The narrower the bandwidth thereof, the longer the distance before uncorrelation occurs.

It is emphasized that the short range radar range fence system of the present invention is effective at ranges in the region of fifty feet more or less, and consequently may be especially useful in short range applications.

What is claimed is:

1. A radar fence system comprising means to generate exclusively an unmodulated noise signal, said noise signal having a predetermined bandwidth in accordance with the distance of the radar fence, antenna means to transmit said noise signal toward a target of interest to determine the location thereof to be within or without a predetermined distance, means to phase shift said noise signal, said phase shifter having a phase difference of about one-half wavelength between the minimum and maximum values of said phase shifting means, means to receive reflected signals from said target of interest, said antenna means and said receive means operating in such a manner as to separate the transmitted noise signal and the received reflected signal, detector means receiving the phase shifted noise signal and the received reflected signal for observation of the interaction therebetween at the output thereof, the detector means output signal being modulated only if said target of interest is within said predetermined distance.

2. A radar fence system as described in claim 1 further including means to amplify the output signal of said detector means to provide a control signal.

3. A radar fence system as described in claim 1 wherein said antenna means and said receive means are physically separated.

4. A radar fence system as described in claim 1 further including means to periodically switch said phase shifter means at a preselected rate.

* * * * *